(12) United States Patent
Fisciier et al.

(10) Patent No.: US 7,718,159 B2
(45) Date of Patent: May 18, 2010

(54) PROCESS FOR CO-PRODUCTION OF ELECTRICITY AND HYDROGEN-RICH GAS STEAM REFORMING OF A HYDROCARBON FRACTION WITH INPUT OF CALORIES BY COMBUSTION WITH HYDROGEN IN SITU

(75) Inventors: Béatrice Fisciier, Lyons (FR); Fabrice Giroudiere, Orlienas (FR); Anthony Arnaud, Lyons (FR)

(73) Assignee: Institut Francais du Petrole, Rueil Malmaison, Cedex (FR)

( * ) Notice: Subject to any disclaimer, the term of this patent is extended or adjusted under 35 U.S.C. 154(b) by 363 days.

(21) Appl. No.: 11/797,897

(22) Filed: May 8, 2007

(65) Prior Publication Data

US 2008/0087863 A1 Apr. 17, 2008

(30) Foreign Application Priority Data

May 9, 2006 (FR) .................................. 06 04175

(51) Int. Cl.
*C01B 3/24* (2006.01)
*C01B 3/26* (2006.01)
(52) U.S. Cl. ....................... 423/650; 423/651
(58) Field of Classification Search ................. 252/373
See application file for complete search history.

(56) References Cited

U.S. PATENT DOCUMENTS

| 6,025,403 | A | * | 2/2000 | Marler et al. ............... 518/703 |
| 6,235,262 | B1 | * | 5/2001 | Andersen .................... 423/650 |
| 6,451,465 | B1 | | 9/2002 | Chalfant et al. |
| 2004/0029057 | A1 | * | 2/2004 | Pettit ............................ 431/7 |
| 2004/0079031 | A1 | | 4/2004 | Seaba et al. |
| 2004/0209131 | A1 | | 10/2004 | Bolton et al. |
| 2005/0026011 | A1 | | 2/2005 | Suzuki et al. |
| 2006/0260321 | A1 | | 11/2006 | Minkkinen et al. |

FOREIGN PATENT DOCUMENTS

| EP | 0814146 A2 | 12/1997 |
| EP | 122805 A2 | 8/2001 |
| EP | 1382568 A | 1/2004 |
| EP | 1505036 A | 2/2005 |
| FR | 2852358 A1 | 9/2004 |
| WO | WO 02/102708 A | 12/2002 |
| WO | WO 03/028876 A | 4/2003 |

* cited by examiner

*Primary Examiner*—Melvin C Mayes
*Assistant Examiner*—Kenneth Vaden
(74) *Attorney, Agent, or Firm*—Millen, White, Zelano & Branigan, P.C.

(57) ABSTRACT

The invention describes a process for co-production of electricity and a hydrogen-rich gas by steam reforming of a hydrocarbon fraction with input of calories by combustion with the hydrogen that is produced inside the steam reforming reactor-exchanger.

21 Claims, 3 Drawing Sheets

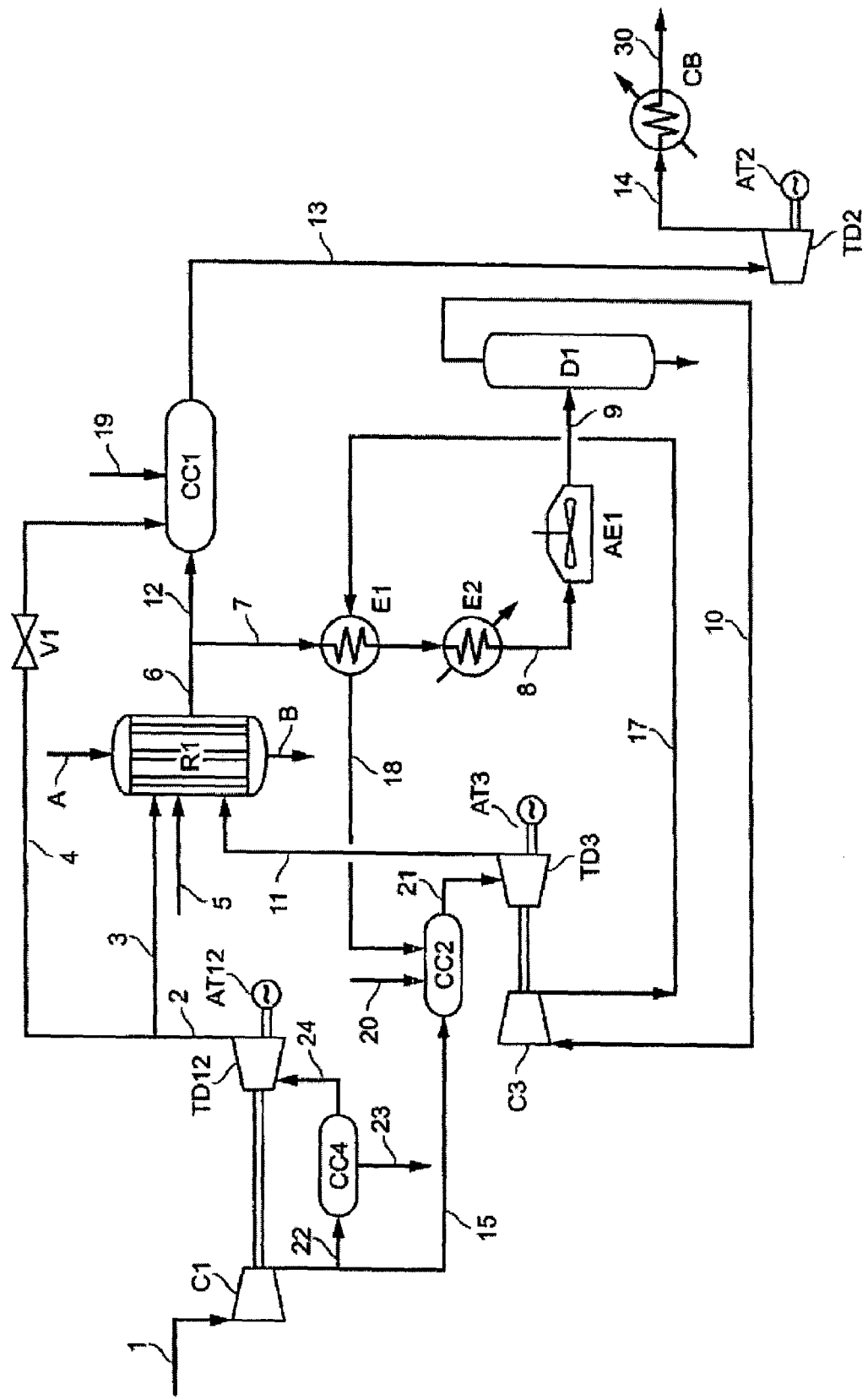

Figure 1:
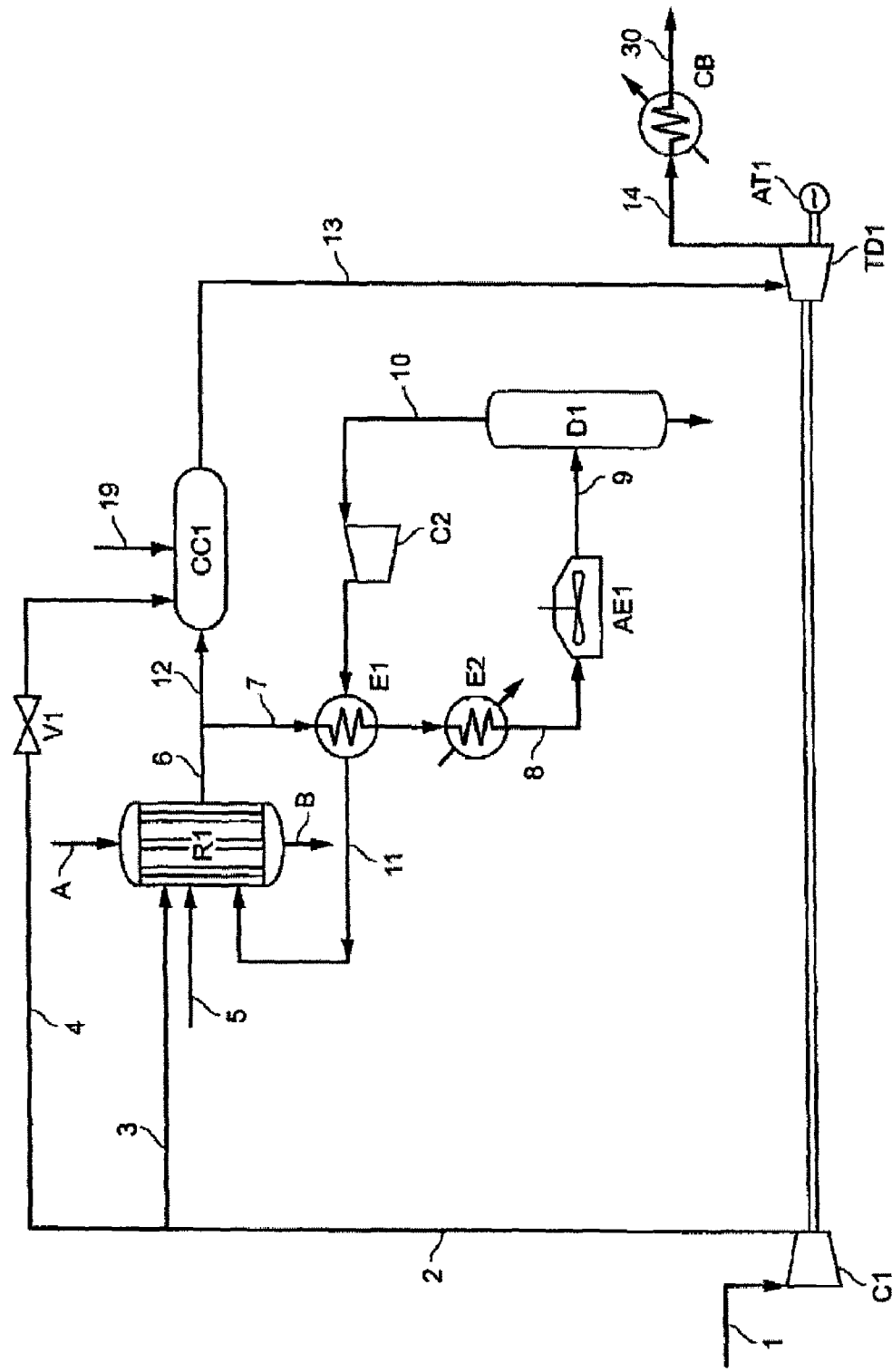

PROCESS FOR CO-PRODUCTION OF ELECTRICITY AND HYDROGEN-RICH GAS STEAM REFORMING OF A HYDROCARBON FRACTION WITH INPUT OF CALORIES BY COMBUSTION WITH HYDROGEN IN SITU

FIELD OF THE INVENTION

The invention is set in the field of the processes for production of a hydrogen-rich gas and for co-production of electrical energy via a gas turbine and without production of CO2 other than the CO2 that is part of the effluent of the process.

The gas turbines are installations for generally inexpensive electricity production relative to the nuclear plants or carbon plants that are quite simple and fast to build. They offer advantages from a maintenance and operational standpoint, and they constitute a more "suitable" energy source (in particular based on the absence of sulfur in fuel), whereby the primary difficulty to be resolved is that of the carbon dioxide emissions.

In the face of the problems of the reduction of CO2 wastes, two solutions can be considered: the first solution is to collect CO2 by washing the smoke that exits from the turbine and by collecting the CO2 from it, but this solution is difficult and relatively less effective because of the collection pressure that is too low.

The second solution is to use a fuel whose combustion does not generate CO2, i.e., a fuel that primarily contains hydrogen. This solution was considered in the process that is described in the patent application FR-A1-2 852 358, in which the production of hydrogen by steam reforming of a hydrocarbon feedstock is used in part to ensure the input of heat that is necessary to the operation of the turbine. The input of calories that is necessary for the steam reforming is done in this concept by indirect heat exchange between the warm smoke of the turbine and the steam reforming feedstock inside a reactor-exchanger.

This invention is also part of the field of the generation of hydrogen.

The hydrogen-rich gas that is produced by the steam reforming reactor is generally called a synthesis gas by one skilled in the art. It consists essentially of a mixture of hydrogen (H2) and carbon dioxide (CO2) in typical proportions of 65 mol % to 75 mol % of hydrogen (in a dry base) and 6 mol % to 10 mol % of CO2, and can also contain carbon monoxide (CO) in a proportion that can range from 7 mol % to 16 mol %.

In general, at the end of the steam reforming reactor, said synthesis gas is introduced successively into two CO conversion reactors ("water gas shift reactor" or W. G. S. reactor according to English terminology), a first so-called "high-temperature" reactor, followed by a second so-called "low-temperature" reactor, making it possible to carry out a conversion of CO into CO2 in the presence of water and to increase the production of hydrogen.

At the outlet of the CO conversion reactor or reactors, the CO content of the synthesis gas is lowered to a content of between 2 mol % and 3 mol % at the end of the first reactor and lowered to a content of between 0.1 mol % and 0.3 mol % at the end of the second reactor.

This invention consists in producing combustion with hydrogen at the very interior of the steam reforming reactor-exchanger so as to limit the necessary smoke flow rates and to improve the effectiveness of the heat transfers to the reaction zone. Whereby the combustion with hydrogen poses safety problems, however, an at least partial recycling of the combustion effluents then becomes indispensable. This recycling makes it possible to work in an almost inert atmosphere.

PRIOR ART

Among the documents of the prior art the patent FR 2 852358 describes a process for turbine co-generation in which a portion of the hot gases that are obtained from the pressurized combustion combined with the turbine is used as an input of calories in a process that employs a heat exchange or a chemical reaction with an endothermic nature. This calorie input thus can be carried out by indirect exchange between the hot smoke and the steam reforming fluid inside a steam reforming reactor. The process that is described in this patent does not teach the manner of controlling the combustion with hydrogen that makes it possible to supply the calories that are necessary to the steam reforming reaction. In addition, said input of calories is not carried out in situ, but in a post-combustion cell that is located upstream from the steam reforming reactor.

This invention consists in carrying out combustion inside the steam reforming reactor-exchanger, so as to limit the necessary smoke flow rates or to increase the hydrogen production for the same turbine. However, whereby the combustion with hydrogen poses safety problems due to the very high temperature and speed of combustion of the hydrogen, an at least partial recycling of the combustion effluents that makes it possible to work in an almost inert atmosphere is then necessary. This recycling is the subject of a special circuit that is described in this invention.

Within the scope of this invention, a portion of the steam that is generated by the combined cycle is used in a mixture with the steam reforming feedstock to carry out the steam reforming reaction and to generate the hydrogen.

SUMMARY DESCRIPTION OF THE FIGURES

FIG. 1 is a representation of the basic diagram of the process according to the invention in which the circuit of the combustion effluent comprises only one recompression phase that is designed to compensate the feedstock losses of said circuit.

Figure 2:
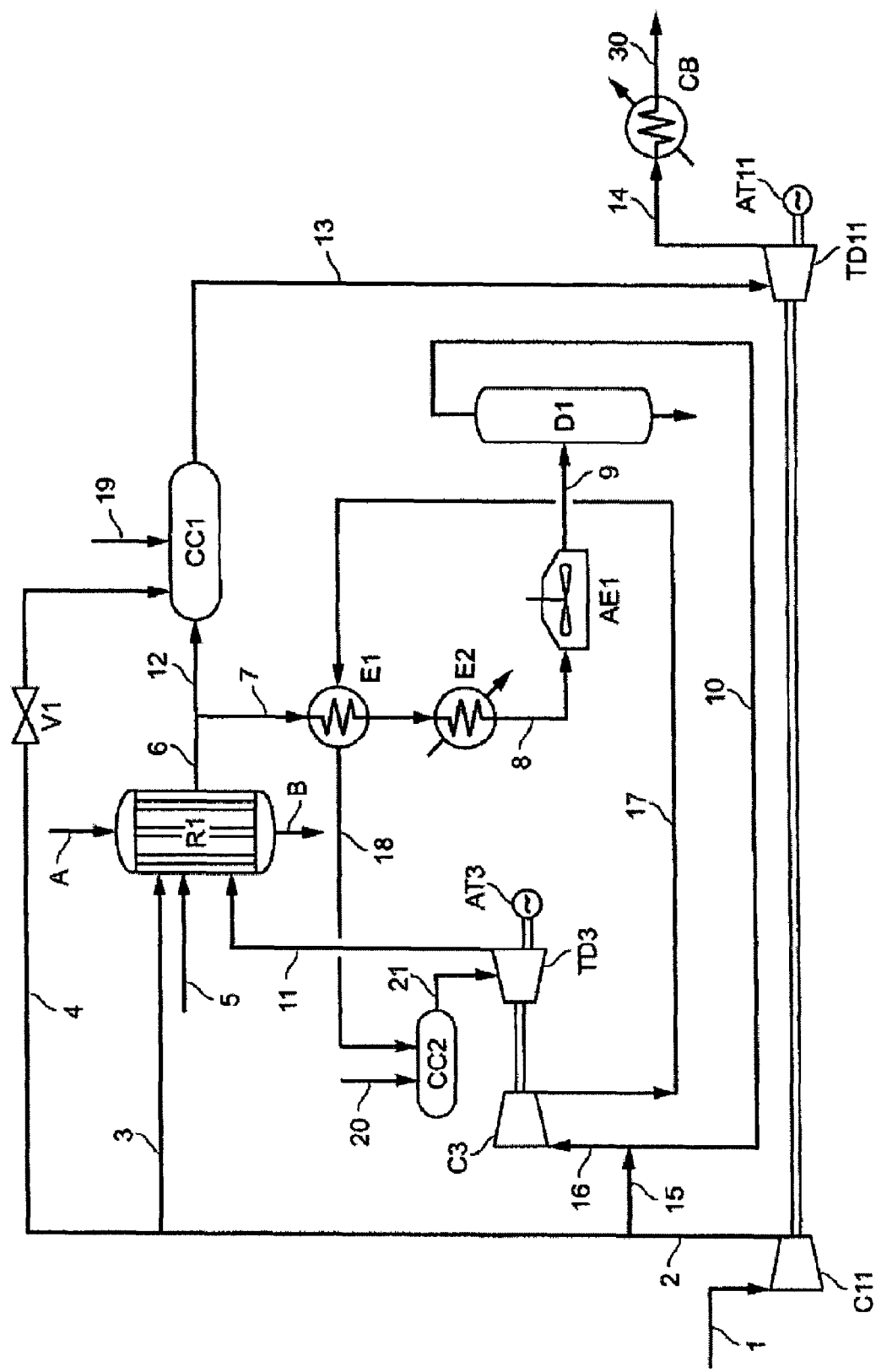

FIG. 2 is a representation of the process diagram according to the invention in a first variant in which the circuit of the combustion effluent comprises a recompression phase and at least one phase for reheating by combustion with hydrogen, whereby said reheating phase may or may not be followed by an expansion phase. The compression of the air is done up to a lower pressure than for the basic diagram.

FIG. 3 is a representation of the process diagram according to the invention in a second variant in which the nitrogen circuit comprises a recompression phase, and at least one reheating phase by combustion with hydrogen with an input of air that is directly obtained from the compressor of the combustion air that is necessary to the steam reforming reaction, whereby said reheating phase may or may not be followed by an expansion phase. The compression of the air is done up to the same pressure level as that of the basic diagram.

SUMMARY DESCRIPTION OF THE INVENTION

This invention can be defined as a process for the production of synthesis gas by vapor reforming of a petroleum fraction and for co-production of electrical energy, in which the input of calories necessary for the steam reforming reaction is carried out by a dilute hydrogen combustion carried out inside the steam reforming reactor-exchanger, whereby said combustion is controlled by the recycling of a portion of the effluent of said combustion that plays the role of dilution gas of the hydrogen that is necessary for the combustion.

This invention relates more particularly to the method for input of the calories that are necessary for the endothermic reaction of steam reforming, which is carried out by means of a combustion with dilute hydrogen in the very interior of the steam reforming reactor, which is called "combustion in situ" below.

The input of calories required by the steam reforming reaction is carried out within the scope of this invention by means of the dilute hydrogen combustion within a cover gas, constituted for the most part of nitrogen and called a combustion effluent or sometimes a dilution gas. Said combustion effluent (or said dilution gas) is the object of a particular circuit that is described in detail below. The calories are transferred to the steam reforming circuit by indirect exchange with the dilution circuit in the very interior of the reactor. In the text below, the reactor-exchanger will be mentioned to designate the steam reforming reactor.

The process according to the invention also makes it possible to co-produce the energy, for example electrical energy, on the one hand with the assistance of the high-temperature effluent that is sent into the combustion chamber then into an expansion turbine, and on the other hand by generating the medium-pressure steam at various points of the process located downstream from the reactor-exchanger.

In a general manner, and this is one of the aspects of the invention, the process produces a high degree of thermal integration by using heat exchangers/effluent or effluent/effluent making it possible to recover calories at different temperature levels.

Another important aspect of the process according to the invention is that it does not accompany any CO2 production other than that corresponding to the synthesis gas itself. The collection of CO2 contained in the synthesis gas can be carried out with conventional processes, since this CO2 production is done at high pressure.

The process for production of synthesis gas according to the invention can therefore be defined as a process by steam reforming of a hydrocarbon feedstock (A) in a steam reforming reactor (R1) and for co-production of electrical energy, in which the input of calories required by the steam reforming reaction is obtained by combustion with hydrogen (3) diluted by a portion of combustion effluents (11), whereby said combustion is carried out inside the reactor-exchanger (R1), the air that is necessary for said combustion (1) is compressed to a pressure of between 0.4 and 4 MPa absolute by means of the compressor (C1), and whereby the effluent that results from said combustion (6) constituting the dilution circuit is, for a portion (7 becoming 11), recycled at the inlet of said reactor-exchanger so as to dilute the hydrogen (3) and to limit the oxygen content in the reactor-exchanger (R1) to a value of less than 10 mol %, whereby the other portion (12) of the combustion effluent is introduced into a post-combustion chamber (CC1), the flow (13) resulting from the combustion with hydrogen (19) in the post-combustion chamber (CC1) is expanded in a turbine (TD11 or TD2) that in part provides the energy that is necessary to the compressor (C1) and that drives an alternator (AT11 or AT2) that ensures the co-production of electrical energy.

One of the advantages from the energy standpoint of the process for the production of synthesis gas according to the invention is that it makes it possible to reintroduce the combustion effluent (11) into the reactor-exchanger (R1) at a temperature that is as close as possible to that of the outlet of the effluent (6). By the expression "as close as possible," it is understood that the difference between the temperatures of the effluents (6) and (11) is less than 10° C., preferably less than 5° C., and very preferably less than 1° C.

Finally, the steam reforming process according to the invention does not generate any CO2 waste in its combustion circuit.

DETAILED DESCRIPTION OF THE INVENTION

Within the scope of this invention, the production of synthesis gas is obtained by steam reforming of a hydrocarbon fraction that is characterized in general by its mean number of carbon atoms or its distillation interval.

The hydrocarbon fraction that constitutes the feedstock of the process is preferably a fraction that consists of hydrocarbons with a carbon atom number that can range from 1 to 20. In particular, the feedstock can, preferably, be a naphtha fraction with a distillation interval of between 70° C. and 250° C. or natural gas. This fraction can also optionally comprise alcohols, such as methanol or ethanol, or heavier alcohols, in variable proportions.

For good comprehension of the following description, it is advisable to properly distinguish the combustion effluent, which is used to provide the calories that are necessary for the endothermic reaction of steam reforming, from the effluent of the steam reforming process itself that is a mixture of CO, CO2 and H2 that constitute the synthesis gas.

The combustion in situ, i.e., inside the reactor-exchanger, is carried out by means of dilute hydrogen and compressed combustion air and produces a combustion effluent that essentially contains steam and nitrogen.

This invention relates to the circuit of the effluent of the combustion that is necessary for the input of calories, which will also be called: circuit of the combustion effluent, or sometimes: nitrogen dilution circuit, because it consists for the most part of nitrogen.

The recycling circuit of the combustion effluent comprises at least one heat exchange phase and one recompression phase. Regardless of the technology of the reactor-exchanger, the latter comprises a combustion circuit that is fed by the air (combustive agent), hydrogen (fuel), and the recycling of a portion of the combustion effluent, the combustion in the reactor-exchanger starting from these 3 flows generating said combustion effluent.

This combustion effluent is separated into at least two flows, a first flow constituting the circuit of the combustion effluent that is the most significant and that is recycled upstream from the reactor-exchanger by making it possible to limit the oxygen content at the input of said reactor-exchanger, and a second flow that is directed toward a post-combustion chamber that is placed downstream from the reactor-exchanger.

The circuit of the combustion effluent according to the invention, which can exhibit variants according to the pressure level and the temperature level of said combustion effluent at the inlet of the reactor-exchanger, is described in detail below.

The fuel, essentially of the hydrogen that is obtained at least in part, and optionally completely, from the steam reforming reaction, is introduced into the reactor-exchanger at the same pressure as that of the combustion air and as that of the combustion effluent, with feedstock losses close to the circuit of said combustion effluent and at the highest temperature level possible. The fuel can be introduced separately or mixed with the combustion effluent. It may be introduced at one or more points of the reactor-exchanger.

The following description presents the basic diagram of the process according to the invention as well as the two variants in a detailed manner. It will be better understood by following FIG. 1 that shows the basic diagram. FIGS. 2 and 3 show variants that will be described only for the part or parts that distinguish them from the basic diagram. For the sake of simplicity, the numbers of various flows are identified with numbers of lines conveying said flows.

The basic diagram according to FIG. 1 corresponds to the existence of a single chamber of post-combustion (CC1) that is placed downstream from the reactor-exchanger (R1) that makes it possible to bring the effluents from the combustion that are obtained from said reactor-exchanger to a temperature that is between 1000° C. and 1300° C. These temperature values correspond to the state of the art in gas turbines.

Combustion air (1) is sent into a compressor (C1) so as to produce compressed air (2) at a temperature of between 180° C. and 650° C. and under a pressure of between 0.4 MPa and 4 MPa absolute, preferably between 1.5 MPa absolute and 2 MPa absolute.

This compressed air (2) is introduced at least in part in the reactor-exchanger (R1) via the line (3). The compressed air can also be introduced into the reactor-exchanger (R1) mixed with the flow (11).

The hydrogen that is necessary for the combustion is introduced into the reactor-exchanger via the line (5) at a pressure level that is identical or very close to that of the compressed air (3). The hydrogen (5) can be introduced into the reactor-exchanger (R1) either separately or mixed with the flow (11). The hydrogen flow rate (5) is defined by the desired temperature level on the side initiated at the outlet of the steam reforming catalyst, temperature generally on the order of 850° C. to 900° C. In general, the temperature of the steam reforming reaction is regulated by means of the hydrogen flow rate (5).

The flow rate of combustion air (3) is regulated for preferably having less than 1 mol % of oxygen and preferably less than 0.5 mol % of oxygen in the combustion effluents. In most cases, the hydrogen (5) is obtained from reactor-exchanger effluents after passing into CO conversion reactors (not shown in FIG. 2) and after separation of CO2 and water contained in said effluent. In general, almost all of the CO2 is collected in a collection unit that employs an absorption solvent that can be methanol (as in the process known under the trade name of IFPEXOL) or amines such as MEA (methyl-ethylamine), DEA (diethylamine), or MDEA (methyl-diethylamine) that is used as an additive.

The flow (11) that essentially contains nitrogen, a little uncondensed water, and a minor portion of oxygen, is introduced into the reactor-exchanger via the line (11).

This flow (11) is called combustion effluent, or nitrogen dilution effluent, to recap its function. Minor portion of oxygen is defined as a proportion that is generally less than 1 mol % and preferably less than 0.5 mol %.

The combustion effluent leaves the reactor-exchanger via the line (6) at a temperature that is generally between 600° C. and 1100° C. and preferably between 700° C. and 800° C. This combustion effluent (6) is divided into at least one fraction (7) that supplies the circuit of the combustion effluent that is described below, and a fraction (12) that is introduced into a post-combustion chamber (CC1). The proportion of flow (7) that is recycled upstream from the reactor-exchanger (R1) is such that in the case where the combustion air mixes with the nitrogen dilution effluent (11), there is generally less than 10 mol % of oxygen, preferably less than 6 mol % of oxygen, at the input of the reactor-exchanger on the combustion side, for limiting the combustion temperatures of the hydrogen.

There are different injection modes of said flow (11), namely either separately, as shown in FIGS. 2 to 4, or mixed with the air flow (3), or mixed with the hydrogen flow (5). One or the other of the flows (5) and (3), or both, can also be introduced at several separate points of the reactor-exchanger so as to create a certain dispersion of the fuel and/or the combustible agent in the steam reforming reactor-exchanger. This invention is perfectly compatible with an introduction at one or more points of the flows (11), (5) and (3).

The combustion effluent (7) is cooled in a first exchanger (E1) that generally has, for a cooling fluid, the combustion effluent itself taken to a lower temperature level, then optionally in a second exchanger (E2) using a cooling fluid that optionally can be constituted of condensates that are vaporized in E2 into low-pressure steam. The cooling fluid of the exchanger (E2) can also be water that is thus preheated before supplying a combined cycle (CB) that is placed downstream from the expansion turbine (TD1) that is combined with the combustion air compressor (C1). In some cases, the cooling fluid of the exchanger (E2) can be the feedstock of the reactor-exchanger, consisting of a mixture of the hydrocarbon feedstock and the steam (denoted as A in FIG. 2).

The cooling of the combustion effluent (8) is continued in the cooling tower (AE1) or in an exchanger by means of cooling water, so as to cool it before the input, via the line (9), in the separation tank (D1) to a temperature that is lower than the dew point of said combustion effluent at the input pressure of said tank (D1). Under these conditions, it is possible to recover, by simple condensation, a major portion of the water that is contained in the combustion effluent (9).

In general, the pressure at the separation tank (D1) is equal to the output pressure of the reactor-exchanger (setting of the combustion side) reduced by losses of feedstocks on the circuit of the combustion effluent due to the exchangers (E1) and (E2) and to the cooling tower (AE1).

The combustion effluent (10) that no longer contains water after the separation tank (D1) is recompressed in the compressor C2, so-called recycling compressor, at a pressure level that makes it possible to find the pressure at the input of the reactor-exchanger (R1), then it is reheated in the exchanger (E1) and reintroduced in the reactor-exchanger (R1) in the form of the flow (11) at a temperature that is generally from 0.5° C. to 50° C. and preferably from 1° C. to 10° C. below the temperature of the effluent (6).

Numerous variants may exist at the circuit of the combustion effluent, the objective on the plane of the overall economy of the process, since the effluent (11) is reintroduced in the reactor-exchanger (R1) at a temperature that is as close as possible to the output temperature of the effluent (6).

The variants of FIGS. 2 and 3 of this process make it possible to produce this condition even better. The portion of compressed air (4) that has not supplied the reactor-exchanger (R1) is introduced according to a pressure-reducing element (VI) into a combustion chamber (CC1) that makes it possible, by combustion with hydrogen (19), to raise as much as possible the temperature level of the flow (12) to a value that is generally between 1000° C. and 1300° C. The pressure-reducing element (VI) introduces a loss of feedstock in the circuit (4) so as to balance the pressure of the combustion chamber (CC1) with that of the flow (12) at the output of the reactor-exchanger (R1).

The flow (12) essentially consists of nitrogen and steam that result from the combustion of hydrogen. The flow (12) that consists of a portion of the combustion effluents (6) is introduced into the post-combustion chamber (CC1). The flow (13) that results from the combustion with hydrogen (19) in the post-combustion chamber (CC1) is expanded in a turbine (TD11 or TD2) that provides in part the energy that is necessary to the compressor (C1) and that can, in some cases, drive an alternator (AT11 or AT2).

The expanded effluent (14) is found at a pressure that is close to the atmospheric pressure. This flow (14) can be used as a coolant to carry out the generation of steam, as shown in FIG. 1 by the exchanger (CB), or else used as a coolant to preheat the feedstock of the reactor-exchanger (R1). Other uses of the flow (14) are possible and remain within the scope of the process according to this invention.

The hydrogen (5) that is used to carry out the combustion at the reactor-exchanger (R1) and the hydrogen (19) of the post-combustion chamber (CC 1) are advantageously constituted by at least a portion of the hydrogen that is produced as an effluent of the reactor-exchanger (R1).

The variants of FIGS. 2 and 3 make it possible, relative to the basic diagram of FIG. 1, to introduce the combustion effluent (11) at a temperature that is equal to or greater than that of the combustion effluents (6). This offers an advantage from the standpoint of the fuel consumption.

The two variants described in the text below are compatible with the different methods for introducing air (3), hydrogen (5), and the combustion effluent that is recycled (11) in the reactor-exchanger (R1). FIGS. 3 and 4 show an introduction that is separate from each of these 3 flows, but an introduction in a mixture of flows (5) and (11) or flows (3) and (11) is perfectly possible.

In the first variant according to FIG. 2, the compressor (C11) makes it possible to compress the air at an intermediate pressure of between 0.3 and 0.8 MPa. A portion of the compressed air (15) is sent to the cover gas circuit. The combustion effluent (7) follows the same cooling diagram in the exchangers (E1) and (E2) and the cooling tower (AE1), and the same diagram of separation of the water in the tank (D1) as in the basic diagram of FIG. 1. As in FIG. 1, the flow (10) is the condensed water removed from the cover gas in the separation tank (D1).

In contrast, the flow (16) that results from the mixing of the flows (10) and (15) is introduced into the compressor (C3) that makes it possible preferably to raise the pressure level of 0.3 to 0.8 MPa typically to 1.5 to 2.5 MPa. In the feeding back of the compressor (C3), the flow (17) is reheated in the exchanger (E1), preferably to a temperature of between 600° C. and 700° C., and very preferably to a temperature of about 680° C., then it is introduced into a combustion chamber (CC2) that is supplied with fuel via hydrogen (20).

The flow (21) that is obtained from the combustion chamber (CC2) is preferably at a temperature level of between 1000° C. and 1300° C. This flow (21) is expanded in a turbine (TD3) that is combined with the compressor (C3) at a pressure level that is very close to the pressure level of the combustion air (3) that is introduced into the reactor-exchanger (R1).

The expanded effluent (11) is introduced into the reactor-exchanger (R1). Taking into account the combustion by means of the hydrogen flow rate (20) that is introduced into the combustion chamber (CC2), said effluent (11) is then found at a temperature that is close to the temperature of the combustion effluent, which represents a favorable factor from the standpoint of the combustion with hydrogen inside the reactor-exchanger (R1).

In the second variant, of FIG. 3, the circuit of the combustion effluent is the same as in the variant of FIG. 2. In contrast, a circuit that is different from the combustion air (15) and that is necessary for the combustion of hydrogen (20) in the combustion chamber (CC2) makes it possible to reduce the size of the compressor (C3). The compressed air (15) that is obtained from the compressor (C1) at a pressure level of about 1.5 to 2.5 MPa is introduced at least in part directly into the combustion chamber (CC2).

The other portion of the compressed air (22) is introduced into a combustion chamber (CC4) into which is carried out the combustion of a hydrogen flow (23) that produces a combustion effluent (24) that is expanded into the turbine (TD12) that is combined with the compressor (C1) and with the alternator (AT12).

The expanded effluent (2) that is obtained from the turbine (TD12) has a pressure level of about 0.3 to 0.4 MPa and preferably a temperature of about 600-700° C. It is introduced in part into the reactor-exchanger (R1) via the line (3) and in part into the combustion chamber (CC1) via the line (4) and the pressure-reducing element (VI) by following the same diagram as the one that is described in the basic case.

The effluent (13) that is obtained from the post-combustion chamber (CC1) is expanded in a turbine (TD2) that, contrary to the basic diagram and to the first variant, no longer drives the compressor (C1) or (C11) but only an alternator (AT2) that produces the electrical energy. This variant makes it possible to produce more electrical energy than in the first variant (FIG. 2) or the basic case (FIG. 1). It illustrates the possibilities for modulating the co-production of electrical energy.

EXAMPLES ACCORDING TO THE INVENTION

Example 1

This example is provided by way of illustration of the process according to this invention and corresponds to the basic diagram shown by FIG. 1. The steam reforming feedstock consists of 90 (mol) % of methane, 8 mol % of ethane, and 2 mol % of carbon dioxide. The feedstock flow rate is 3,500 kmol/hour. The amount of water that is introduced with the steam reforming feedstock corresponds to a water/carbon ratio of 3.

The steam reforming feedstock that is supplemented with the amount of water constitutes the flow (A). The effluent flow rate of the reaction (B) is 21,490 kmol/hour. The steam reforming catalyst is a catalyst with a nickel base deposited on commercial alumina KATALCO 23-4Q of Johnson Mattey.

The conditions of the reaction are as follows:
Output temperature of the catalyst: 900° C.
Pressure: 2.5 MPa as input (1 MPa=10 bar)
Air (1) with a flow rate of 70,240 kmol/hour is compressed in the compressor (C1) at a pressure level of 2 MPa. The compressed air (3) is introduced into the reactor-exchanger (R1) at a temperature of 500° C. This air flow rate (3) is regulated so as to maintain an oxygen content of 0.5 mol % in the combustion effluent.

The combustion hydrogen (5) that is obtained from the effluent (B) after passing into the CO conversion reactors at high and low temperature and from a CO2 collection unit (not shown in the diagram of FIG. 1) is introduced separately into the reactor-exchanger (R1) with a partial flow rate of 3,450 kilomol/hour. The combustion effluent (11) is introduced separately into the reactor-exchanger (R1) with a flow rate of 31,400 kilomol/hour.

The recycling rate of the flow (6) to the reactor-exchanger (R1) is 80%. At the exchanger (E1), the temperature is approximately 50° C.

The crude production of hydrogen that is obtained from the steam reforming effluent after low- and high-temperature shift reaction and separation of CO2 is: 12,830 kilomol/hour, or 287,536 Nm3/hour. The net production of hydrogen, i.e., the reduced crude production of hydrogen of the two consumptions of smoke-side hydrogen (flow (5) and flow (19)) is 2,780 kilomol/hour, or 62,310 Nm3/hour.

The electric power generated by the alternator (AT1) is 92.2 MW. It is the power supplied by the turbine (TD1) reduced by the power that is necessary for the compressor (C1). The electric power that is generated by the combined cycle (CB) is 98.8 MW. The total electric power (CB)+(AT1) is therefore 191 electric MW.

Table 1 below provides the flow rate and the composition of different flows constituting the circuit of combustion effluents, as well as the temperature and pressure levels. The flow numbers correspond to those of FIG. 1.

is regulated so as to maintain an oxygen content of 0.3 mol % in the combustion effluent (6).

The combustion hydrogen (5) that is obtained from the effluent (B) after passing into the high- and low-temperature CO conversion reactors and from a $CO_2$ collection unit (not shown in the diagram of FIG. 2) is introduced separately into the reactor (R1) with a partial flow rate of 2,460 kilomol/hour.

Another portion of the compressed air (15) is compressed with the dilution nitrogen (10) in the compressor (C3) up to a pressure level of 2 MPa for the effluent (17). Its flow rate is regulated so as to maintain an oxygen content of 0.3 mol % in the combustion effluent (21) of the combustion chamber (CC2).

TABLE 1

Example 1 According to FIG. 1

| | | Flow Number | | | | | | |
|---|---|---|---|---|---|---|---|---|
| | | 1 | 2 | 3 | 4 | 5 | 6 | 7 |
| Temperature | ° C. | 20 | 507 | 507 | 507 | 30 | 700 | 700 |
| Pressure | MPa Absolute | 0.1 | 2.0 | 2.0 | 2.0 | 1.79 | 1.69 | 1.69 |
| Molar Flow Rate | kmol/h | 70,241 | 70,241 | 9,524 | 60,718 | 3,674 | 42,884 | 34,307 |
| Composition | (mol/mol) | | | | | | | |
| CH4 | | | | | | 0.031 | | |
| H2 | | | | | | 0.939 | | |
| CO | | | | | | 0.004 | 0.002 | 0.002 |
| CO2 | | | | | | 0.024 | 0.024 | 0.024 |
| H2O | | | | | | | 0.091 | 0.091 |
| O2 | | 0.21 | 0.21 | 0.21 | 0.21 | | 0.005 | 0.005 |
| N2 | | 0.79 | 0.79 | 0.79 | 0.79 | 0.002 | 0.878 | 0.878 |
| TOTAL | | 1 | 1 | 1 | 1 | 1 | 1 | 1 |

| | | Flow Number | | | | | | |
|---|---|---|---|---|---|---|---|---|
| | | 11 | 12 | 13 | 14 | 19 | A | B |
| Temperature | ° C. | 650 | 700 | 1,200 | 659 | 30 | 620 | 765 |
| Pressure | MPa Absolute | 1.80 | 1.69 | 1.69 | 0.15 | 1.79 | 2.50 | 2.19 |
| Molar Flow Rate | kmol/h | 31,414 | 8,577 | 73,025 | 73,025 | 7,030 | 15,504 | 21,489 |
| Composition | (mol/mol) | | | | | | | |
| CH4 | | | | | | 0.031 | 0.220 | 0.020 |
| H2 | | | | | | 0.939 | 0.058 | 0.493 |
| CO | | 0.002 | 0.002 | 0.001 | 0.001 | 0.004 | 0.000 | 0.106 |
| CO2 | | 0.026 | 0.024 | 0.008 | 0.008 | 0.024 | 0.024 | 0.051 |
| H2O | | 0.008 | 0.091 | 0.107 | 0.107 | | 0.695 | 0.329 |
| O2 | | 0.006 | 0.005 | 0.124 | 0.124 | | | |
| N2 | | 0.959 | 0.878 | 0.760 | 0.760 | 0.002 | 0.002 | 0.001 |
| TOTAL | | 1 | 1 | 1 | 1 | 1 | 1 | 1 |

Example 2

This second example corresponds to the first variant shown by FIG. 2. The steam reforming feedstock is 7,450 kilomol/hour. The amount of water introduced with the steam reforming feedstock corresponds to a water/carbon ratio of 3.

The conditions of the reaction are as follows:

Output temperature of the catalyst: 900° C.

Pressure: 2.5 MPa at the input (1 MPa=10 bar)

The air (1) with a flow rate of 70,240 kilomol/hour is compressed in the compressor (C1) at a pressure level of 0.5 MPa. A portion of the compressed air (3) is introduced in the reactor (R1) at a temperature of 180° C. This air flow rate (3)

The combustion hydrogen (20) that is obtained from the effluent (B) after passing into the high- and low-temperature CO conversion reactors and from a $CO_2$ collection unit (not shown in the diagram of FIG. 2) is introduced separately into the combustion chamber (CC2) with a partial flow rate of 16,030 kilomol/hour. The combustion effluent (21), expanded in the turbine (TD3), is introduced by the flow (11) separately into the reactor (R1) with a flow rate of 219,000 kilomol/hour. The rate of recycling of the flow (6) toward the steam reforming reactor is 80%. At the exchanger (E1), the temperature is close to 35° C.

The crude hydrogen production that is obtained from the steam reforming effluent after low- and high-temperature CO conversion reaction and separation from CO2 is: 27,300 kilomol/hour or 612,060 Nm3/hour. The net production of hydrogen, i.e., the reduced crude production of hydrogen of the two consumptions of smoke-side hydrogen (flow (5) and flow (19)) is 2,770 kilomol/hour, or 62,070 Nm3/hour.

The electric power generated by the alternator (AT3) is 249 MW. It is the power supplied by the turbine (TD3) reduced by the power that is necessary for the compressor (C3). The electric power that is generated by the alternator (AT11) is 76 MW. It is the power delivered by the turbine (TD11) that is reduced by the power that is necessary for the compressor (C11). The electric power that is generated by the combined cycle (CB) is 152 MW. The total electric power that is generated by (CB), (AT11) and (AT3) is therefore 477 electric MW.

Table 2 below provides the flow rate and the composition of different flows constituting the circuit of combustion effluents, as well as the temperature and pressure levels. The flow numbers correspond to those of FIG. 2.

TABLE 2

Example 2 According to FIG. 2

| | | Flow Number | | | | | | |
|---|---|---|---|---|---|---|---|---|
| | | 1 | 2 | 3 | 4 | 5 | 6 | 7 |
| Temperature | °C. | 15 | 180 | 180 | 180 | 30 | 716 | 716 |
| Pressure | MPa Absolute | 0.1 | 0.5 | 0.5 | 0.5 | 0.5 | 0.4 | 0.4 |
| Molar Flow Rate | kmol/h | 70,241 | 70,241 | 6,667 | 19,765 | 2,624 | 227,209 | 181,767 |
| Composition | (mol/mol) | | | | | | | |
| $CH_4$ | | | | | | 0.031 | | |
| $H_2$ | | | | | | 0.939 | | |
| CO | | | | | | 0.004 | 0.002 | 0.002 |
| $CO_2$ | | | | | | 0.024 | 0.024 | 0.024 |
| $H_2O$ | | | | | | | 0.092 | 0.092 |
| $O_2$ | | 0.21 | 0.21 | 0.21 | 0.21 | | 0.003 | 0.003 |
| $N_2$ | | 0.79 | 0.79 | 0.79 | 0.79 | 0.002 | 0.879 | 0.879 |
| TOTAL | | 1 | 1 | 1 | 1 | 1 | 1 | 1 |

| | | Flow Number | | | | | | |
|---|---|---|---|---|---|---|---|---|
| | | 11 | 12 | 13 | 14 | 19 | A | B |
| Temperature | °C. | 863 | 716 | 1,200 | 952 | 30 | 619 | 765 |
| Pressure | MPa Absolute | 0.5 | 0.4 | 0.4 | 0.15 | 0.4 | 2.50 | 2.22 |
| Molar Flow Rate | kmol/h | 219,120 | 45,442 | 68,624 | 68,624 | 6,439 | 33,001 | 45,741 |
| Composition | (mol/mol) | | | | | | | |
| $CH_4$ | | | | | | 0.031 | 0.220 | 0.020 |
| $H_2$ | | | | | | 0.939 | 0.058 | 0.493 |
| CO | | 0.002 | 0.002 | 0.001 | 0.001 | 0.004 | 0.000 | 0.106 |
| $CO_2$ | | 0.024 | 0.024 | 0.021 | 0.021 | 0.024 | 0.024 | 0.051 |
| $H_2O$ | | 0.084 | 0.092 | 0.155 | 0.155 | | 0.695 | 0.329 |
| $O_2$ | | 0.003 | 0.003 | 0.013 | 0.013 | | | |
| $N_2$ | | 0.888 | 0.879 | 0.810 | 0.810 | 0.002 | 0.002 | 0.001 |
| TOTAL | | 1 | 1 | 1 | 1 | 1 | 1 | 1 |

| | | Flow Number | | | | | | |
|---|---|---|---|---|---|---|---|---|
| | | 10 | 15 | 16 | 17 | 18 | 20 | 21 |
| Temperature | °C. | 20 | 180 | 54 | 333 | 680 | 30 | 1,208 |
| Pressure | MPa | 0.31 | 0.50 | 0.31 | 2.0 | 2.0 | 2.0 | 2.0 |
| Molar Flow Rate | kmol/h | 166,191 | 43,810 | 210,000 | 210,000 | 210,000 | 17,073 | 219,078 |
| Composition | (mol/mol) | | | | | | | |
| $CH_4$ | | | | | | | 0.031 | |
| $H_2$ | | | | | | | 0.939 | |
| CO | | 0.002 | | 0.001 | 0.001 | 0.001 | 0.004 | 0.002 |
| $CO_2$ | | 0.026 | | 0.021 | 0.021 | 0.021 | 0.024 | 0.024 |
| $H_2O$ | | 0.007 | | 0.006 | 0.006 | 0.006 | | 0.084 |
| $O_2$ | | 0.003 | 0.21 | 0.046 | 0.046 | 0.046 | | 0.003 |
| $N_2$ | | 0.961 | 0.79 | 0.926 | 0.926 | 0.926 | 0.002 | 0.888 |
| TOTAL | | 1 | 1 | 1 | 1 | 1 | 1 | 1 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 06/04.175, filed May 9, 2006.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of a synthesis gas (B) by steam reforming a hydrocarbon feedstock (A) in a steam reforming reactor, called reactor-exchanger (R1), and for the co-production of electrical energy, in which the input of calories required for steam reforming is obtained by in situ combustion inside the reactor-exchanger (R1) of a first flux of hydrogen (5) with a flux of air (1), the flux of hydrogen (5) coming from steam reforming reactor-exchanger effluents (B) after separation of any CO2 and H2O contained in said effluents (B), said flux of air (1) necessary for said in-situ combustion being compressed to a pressure of between 0.4 to 4 MPa absolute by a compressor (C1), and wherein effluent of combustion (6) that results from said combustion is divided into at least two portions:

a first portion (7) which is recycled (11) to the input of said reactor-exchanger (R1) so as to dilute the steam reforming hydrogen flux (5) and to limit the oxygen content in the reactor-exchanger (R1) to a value less than 10 mol %, a second portion (12) which is introduced into a post combustion chamber (CC1), said chamber (CC1) also receiving a second flux of hydrogen (19) from steam reforming reactor-exchanger effluent (B), and a portion of compressed air (4) coming from the flux of air (1), a resulting flow (13) of combustion between fluxes (12), (4) and (19) in the post combustion chamber (CC1) being expanded in a turbine (TD1) so as to provide in part the energy necessary for the compression (C1) and that drives an alternator (AT1) that provides the co-production of electrical energy.

2. A process for the production of synthesis gas according to claim 1, in which the combustion effluent (11) is reintroduced into the reactor-exchanger (R1) at a temperature that is as close as possible to that of the output of the effluent (6), the difference between the temperatures of the combustion effluents (6) and (11) being less than 10° C.

3. A process according to claim 2, wherein the difference between the temperature of the effluents (6) and (11) is less than 5° C.

4. A process for the production of synthesis gas according to claim 2, in which the compressed air (3) that is introduced into the reactor-exchanger (R1) is obtained from the following circuit: supply air (1) is introduced into the compressor (C1) that produces a compressed air whose first flow (15) supplies a first combustion chamber (CC2) that operates with a hydrogen flow (20) and produces a combustion effluent (21) that is expanded in the turbine (TD3) for producing the flow (11) that is introduced into the reactor-exchanger (R1) and whose second flow (22) is introduced into a second combustion chamber (CC4) that is supplied by hydrogen (23), the effluent (24) of the combustion chamber (CC4) is introduced into expansion turbine (TD12) to constitute a flow (2) of which a portion (3) constitutes the compressed air flow that supplies the reactor-exchanger (R1).

5. A process for the production of synthesis gas according to claim 1, in which the combustion air is compressed at a pressure that is between 1.5 and 2.0 MPa absolute.

6. A process for the production of synthesis gas according to claim 1, in which the proportion of the effluent of recycled combustion (11) upstream from the reactor-exchanger (R1) represents between 20 mol % and 90 mol % of the combustion effluent (6).

7. A process for the production of synthesis gas according to claim 1, in which, when the recycled combustion effluent (11) is introduced into the reactor-exchanger (R1) separately, the recycled flow (7) represents between 30 mol % and 60 mol % of the combustion effluent (6).

8. A process for the production of synthesis gas according to claim 1, in which, when the recycled combustion effluent (11) is introduced into the reactor-exchanger (R1) mixed with the combustion air (3), the recycled flow (7) represents 60 mol % to 90 mol % of the combustion effluent (6).

9. A process for the production of synthesis gas according to claim 1, in which the combustion effluent (6) is divided into a first flow (12) that is introduced into the combustion chamber (CC1), and a second flow (7) that is cooled in a first exchanger (E1) by cooled combustion effluent (10), then in a second exchanger (E2) by an external cooling fluid, then in a cooling tower (AE1), whereby the flow that exits from the cooling tower (9) is introduced into a separation tank (D1) from which said flow (10) leaves that contains almost no water and is recompressed in a compressor (C2) at a pressure level that is substantially identical to the pressure of the reactor-exchanger (R1), then is reheated in heat exchanger (E1) and reintroduced in the reactor-exchanger (R1) in the form of the flow (11), at a temperature that is from 1° C. to 5° C. below the temperature of the combustion effluent (6).

10. A process for the production of synthesis gas according to claim 9, in which the combustion effluent (11) is reintroduced into the reactor-exchanger (R1) at a temperature that is as close as possible to that of the output of the effluent (6), the difference between the temperatures of the combustion effluents (6) and (11) being less than 10° C.

11. A process for the production of synthesis gas according to claim 10, in which the proportion of the effluent of recycled combustion (11) upstream from the reactor-exchanger (R1) represents between 20 mol % and 90 mol % of the combustion effluent (6).

12. A process for the production of synthesis gas according to claim 9, comprising passing a cooled combustion effluent (8) tank (D1) and resultant gaseous combustion effluent (10) is recompressed in a compressor (C3) at a pressure level that is higher than the pressure of the reactor-exchanger (R1), then is reheated in heat exchanger (E1) and introduced into a post-combustion chamber (CC2) using hydrogen (20) as a fuel, in which it is brought to a temperature of between 1000° C. and 1300° C. and expanded in an expansion turbine (TD3) up to a pressure level that is substantially identical to the one of the reactor-exchanger (R1) before being reintroduced by the flow (11) into said reactor-exchanger (R1) at a temperature that is as close as possible to that of the combustion effluent (6).

13. A process for the production of synthesis gas according to claim 12, in which the compressed air (3) that is introduced into the reactor-exchanger (R1) is obtained from the following circuit: supply air (1) is introduced into the compressor (C1) that produces a compressed air whose first flow (15) supplies a first combustion chamber (CC2) that operates with a hydrogen flow (20) and produces a combustion effluent (21) that is expanded in the turbine (TD3) for producing the flow (11) that is introduced into the reactor-exchanger (R1) and whose second flow (22) is introduced into a second combustion chamber (CC4) that is supplied by hydrogen (23), the effluent (24) of the combustion chamber (CC4) is introduced into expansion turbine (TD12) to constitute a flow (2) of which a portion (3) constitutes the compressed air flow that supplies the reactor-exchanger (R1).

14. A process for the production of synthesis gas according to claim 9, in which the compressed air (3) that is introduced into the reactor-exchanger (R1) is obtained from the following circuit: supply air (1) is introduced into the compressor (C1) that produces a compressed air whose first flow (15) supplies a first combustion chamber (CC2) that operates with a hydrogen flow (20) and produces a combustion effluent (21) that is expanded in the turbine (TD3) for producing the flow (11) that is introduced into the reactor-exchanger (R1) and whose second flow (22) is introduced into a second combustion chamber (CC4) that is supplied by hydrogen (23), the effluent (24) of the combustion chamber (CC4) is introduced into expansion turbine (TD12) to constitute a flow (2) of which a portion (3) constitutes the compressed air flow that supplies the reactor-exchanger (R1).

15. A process for the production of synthesis gas according to claim 1, comprising passing a cooled combustion effluent (8) to a water separation tank (D1) and resultant gaseous combustion effluent (10) is recompressed in a compressor (C3) at a pressure level that is higher than the pressure of the reactor-exchanger (R1), then is reheated in heat exchanger (E1) and introduced into a post-combustion chamber (CC2) using hydrogen (20) as a fuel, in which it is brought to temperature of between 1000° C. and 1300° C. and expanded in an expansion turbine (TD3) up to a pressure level that is substantially identical to the one of the reactor-exchanger (R1) before being reintroduced by the flow (11) into said reactor-exchanger (R1) at a temperature that is as close as possible to that of the combustion effluent (6).

16. A process according to claim 15, wherein the combustion effluent (8) is heated to about 1200° C. in post-combustion chamber (CC2).

17. A process for the production of synthesis gas according to claim 15, in which the compressed air (3) that is introduced into the reactor-exchanger (R1) is obtained from the following circuit: supply air (1) is introduced into the compressor (C1) that produces a compressed air whose first flow (15) supplies a first combustion chamber (CC2) that operates with a hydrogen flow (20) and produces a combustion effluent (21) that is expanded in the turbine (TD3) for producing the flow (11) that is introduced into the reactor-exchanger (R1) and whose second flow (22) is introduced into a second combustion chamber (CC4) that is supplied by hydrogen (23), the effluent (24) of the combustion chamber (CC4) is introduced into expansion turbine (TD12) to constitute a flow (2) of which a portion (3) constitutes the compressed air flow that supplies the reactor-exchanger (R1).

18. A process for the production of synthesis gas according claim 1, in which the compressed air (3) that is introduced into the reactor-exchanger (R1) is obtained from the following circuit: supply air (1) is introduced into the compressor (C1) that produces a compressed air whose first flow (15) supplies a first combustion chamber (CC2) that operates with a hydrogen flow (20) and produces a combustion effluent (21) that is expanded in the turbine (TD3) for producing the flow (11) that is introduced into the reactor-exchanger (R1) and whose second flow (22) is introduced into a second combustion chamber (CC4) that is supplied by hydrogen (23), the effluent (24) of the combustion chamber (CC4) is introduced into expansion turbine (TD12) to constitute a flow (2) of which a portion (3) constitutes the compressed air flow that supplies the reactor-exchanger (R1).

19. A process for the production of synthesis gas according to claim 1, in which, overall, CO2 waste is not generated.

20. A process according to claim 1, wherein the flux of hydrogen coming from the reactor-exchanger effluents is obtained by a CO conversion into CO2, H2O and H2 and after the separation of water and CO2.

21. A process according to claim 1, wherein said first portion recycled to said reactor-exchanger has less than 1 mol percent of oxygen.

* * * * *